United States Patent [19]

O'Boyle

[11] Patent Number: 5,978,196
[45] Date of Patent: Nov. 2, 1999

[54] CONTROL SYSTEM FOR THERMAL PROTECTION OF HIGH WATTAGE LIGHTING

[75] Inventor: Michael S. O'Boyle, Dartmouth, Mass.

[73] Assignee: Lightolier

[21] Appl. No.: 09/174,585

[22] Filed: Oct. 19, 1998

[51] Int. Cl.⁶ ........................................................ H02H 5/04
[52] U.S. Cl. ............................................. 361/103; 315/309
[58] Field of Search .................................. 361/54, 57, 58, 361/93, 94, 99, 103, 105, 106, 93.1; 315/309; 323/907, 369

[56] References Cited

U.S. PATENT DOCUMENTS 3,697,863   10/1972   Kilner ......................................... 361/106
4,713,721   12/1987   Pelonis ....................................... 361/106

*Primary Examiner*—Ronald W. Leja
*Attorney, Agent, or Firm*—Hopgood, Calimafde, Kalil & Judlowe, LLP

[57] ABSTRACT

A thermal protection system for use with a lighting fixture includes a temperature-sensitive switch responsive to the ambient temperature which may have a rating less than that of the lamp. The temperature-sensitive switch controls the operation of a suitably higher rated control device connected to the lamp to turn the lamp off when the ambient temperature above the thermal switch exceeds a predetermined level.

7 Claims, 5 Drawing Sheets

CONTROL SYSTEM FOR THERMAL PROTECTION OF HIGH WATTAGE LIGHTING

BACKGROUND OF THE INVENTION

The present invention relates generally to thermal protectors, and more particularly to a thermal protector for use with a wattage lamp mounted in a recessed lighting fixture.

Recessed lighting fixtures are commonly installed in residential and commercial environments, particularly in installations in which the architect or designer wishes the light source to be relatively unnoticeable. Conventional ceiling recessed lighting installations are described, for example, in U.S. Pat. Nos. 5,222,800; 5,457,617; 5,452,816; 5,347,812; and 4,646,212. In a recessed lighting installation, the light source is contained in a housing which is mounted in a space in the ceiling. The lamp housing is, in turn, mounted to a frame which is secured to the structural supports of the ceiling, such as to the wood joists that support the ceiling.

Depending upon the applicable building codes that deal with electrical and thermal considerations, as well as the goals of the lighting designer, the ceiling space or environment in which the lighting fixture is installed may be either insulated or non-insulated. Fixtures installed in the ceiling space must, as a result, be rated for use in insulated or non-insulated ceilings as appropriate. A ceiling environment that is insulated will tend to retain heat generated by the light source in the lighting fixture more than one that is not insulated.

A ceiling which is not initially insulated during building construction may be retrofitted with thermal insulation at a later date. Recessed lighting fixtures that were originally installed may become overheated after insulation is added because the fixtures may not be rated for use in insulated ceilings.

The use of an improper type or wattage of the light source (bulb) in a recessed lighting fixture or in an incorrectly rated fixture can create hazards, such as the creation of a temperature in the surrounding region that is higher than the fixture (and possibly the surrounding insulation) is able to accommodate. Improper bulb conditions or the use of inappropriately rated recessed lighting fixtures can thus create a potentially dangerous condition with respect to thermal conditions that could constitute a fire hazard.

In recognition of this potential for overheating and its concomitant potential hazards, the National Electrical Code and Underwriters Laboratories Inc. product standards require that recessed lighting fixtures be provided with thermal protectors in order to reduce the risks associated with the improper installation or use of the light source or fixture. When the temperature sensed by the thermal protector exceeds a predetermined maximum level, indicating an overheating condition and a possible fire hazard, a switch, typically a bimetallic switch associated with the thermal protector, opens to disconnect the lamp from the power line, and the lamp is turned off. When the temperature in the space around the thermal protector then falls below the preset dangerous level, the switch closes and the lamp is reconnected to the power line and turns on.

This opening and closing of the thermal protection switch causes the lamp to flash on and off, thereby to indicate the existence of a potentially dangerous overheating problem in the lighting fixture, while preventing the temperature in the fixture from being maintained at a potentially dangerous level. Although thermal protection of this type is commonly used in a recessed lighting fixture, similar thermal protection may also be employed in other types of lighting installations, in which overheating could cause a direct fire hazard.

Commercially available thermal protectors, which are intended for use in a recessed lighting fixture, are rated for limited electrical loads, typically 600 watts, that corresponds to the high-end rating of the most commonly used single lamp socket. Such a limitation in the capacity of the thermal protector may, however, present a problem in lighting fixtures and lighting systems that draw higher electrical loads, such as up to 1000 watts or more that exceed the rating of the thermal protector. Switching a 1000-watt load with a bimetallic switch rated at 600 watts could cause the switch to fail. The failure may result in the switch welding to a closed or "on" position, which would cause the lamp to remain energized or "on". Accordingly, high-wattage lighting fixtures, i.e. those operating at loads greater than 600 watts, cannot be readily provided with code-required thermal protection. Increasing the capacity of the thermal protector is not a practical option since that would substantially increase its cost and size.

There is thus a current need for a thermal protector that can be safely and reliably used in lighting fixtures in which the load exceeds the thermal protector's electrical power rating.

SUMMARY OF THE INVENTION

It is accordingly an object of the present invention to provide a thermal protection system which can be reliably and safely used in a recessed lighting fixture even when the lamp load is greater than the maximum electrical rating of the thermal protector.

It is another object of the present invention to provide a thermal protection system for use with a recessed lighting fixture which is not adversely affected by the operation of a dimmer.

To these ends, the thermal protection system of the invention includes an otherwise conventional (e.g. bimetallic) thermal protector having a maximum electrical rating that may be less than the electrical load of the light fixture. Unlike the conventional thermal protection arrangement, however, the thermal protector, as employed in the arrangement of the present invention, does not by itself switch the lamp off when it senses a temperature exceeding a predetermined safe level, but instead, in response to the ambient temperature, controls the operation of an appropriately rated control or switching device, which may be, as in a preferred embodiment of the invention, a relay whose contact is in series circuit connection with the lamp. The thermal protector switching element is connected in parallel with the lamp and in series with the control element of the control switching device, such as the energizing coil of the electromagnetic relay.

In the operation of the thermal protection system of the invention, when an overheating condition occurs, the thermal protector switch opens causing energizing current to cease flowing through the relay coil, which, in turn, causes the relay contact to open, thereby to remove ac power from the lamp. The resulting turning off of the lamp reduces the temperature in the lamp environment, thereby to maintain the level of safety mandated by the installation code and product standard. Since the thermal protector is electrically isolated from the lamp, the lamp may be controlled by a dimmer or similar device without adversely affecting the level of the thermal protection provided.

To the accomplishment of the above and to such further objects as may hereinafter appear, the present invention relates to a thermal protection system, such as for use in a recessed lighting fixture, substantially as defined in the appended claims, and as described in the following specification as considered along with the accompanying drawings, in which:

DETAILED DESCRIPTION OF THE PREFERRED EMBODIMENTS

Figure 1:
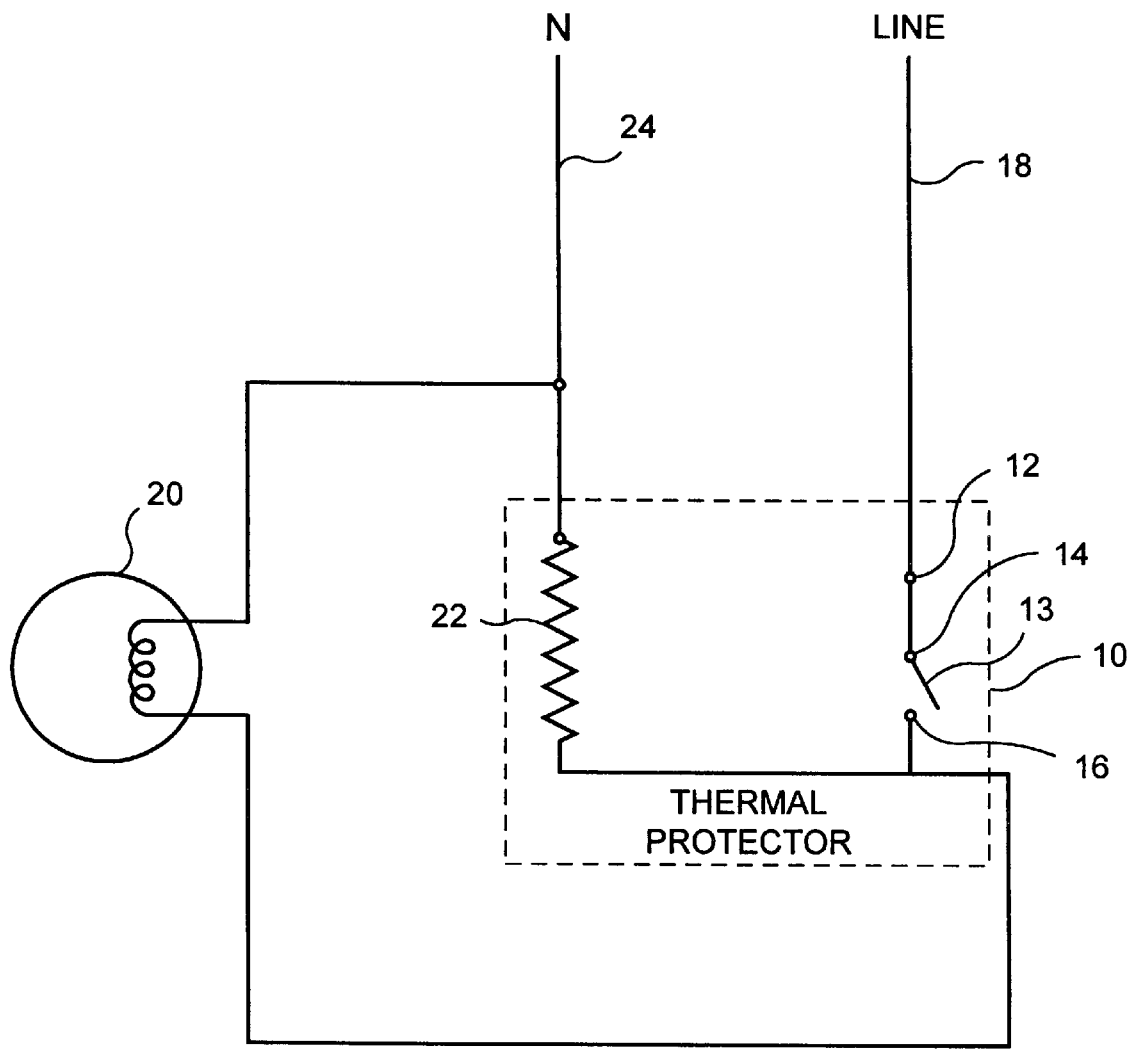
FIG. 1 is a schematic diagram of a prior art thermal protector circuit.

A conventional prior art thermal protector for a recessed lighting fixture, over which the present invention is an improvement, is illustrated in FIG. 1. As therein shown, the thermal protector generally designated 10, includes a temperature-sensitive switch, which, as shown, may be a bimetallic switch 12 having a movable contact 13 and fixed contacts 14, 16. Contacts 14, 16, which are shown in FIG. 1 as being open, are normally closed and are in series connection with the ac power line 18 and the lamp 20 for which the ambient heat and temperature are to be monitored. A resistive-type heater 22 may be, as shown, connected in series between the neutral power line conductor 24 and the lamp 20 to provide, when current flows through it, a reference temperature for the temperature-sensitive switch 12.

In operation, when the temperature in the space about the lamp 20 is within acceptable limits, switch 12 remains closed, and current from the power line 18 flows through the contacts 13, 14, 16 and through the lamp 20 to cause the latter to operate. When, however, the temperature about the lamp 20 exceeds a preset limit, movable contact 13 moves to open the connection between the contacts 14, 16 of switch 12 so as to disconnect the ac power line from lamp 20, thereby turning the lamp off.

Once the lamp is turned off, its ambient temperature will decrease to a level at which the switch contacts 14, 16 again are closed by contact 13, causing lamp 20 to be turned on and its ambient temperature to rise again. As this process of periodic opening and closing of thermal switch 12 continues, lamp 20 turns off and on, thereby to indicate the existence of an overheating problem. The operation of the thermal protector switch in this manner prevents lamp 20 from operating at a maintained or continuous overheated state, thereby reducing the associated risk of fire.

The prior art thermal protection arrangement of FIG. 1 is effective and satisfactory so long as the power rating of the thermal protector switch 12 equals or exceeds the power rating of the lamp 20. Thus, presently available thermal protectors, such as for use in recessed lighting applications, are typically rated at 600 W tungsten, which corresponds to the high-end rating of the most commonly used lamp socket. However, lamp sockets having ratings up to 1000 watts or more are now in common use, and for these lighting installations, the known code-required thermal protector cannot be safely used.

The thermal protection system of the present invention, as exemplified in the various embodiments illustrated in FIGS. 2–5, provides a solution to this problem by, as broadly considered, controlling a higher-wattage lighting fixture or lamp with a suitably rated control or switching element having a load rating that corresponds to that of the lamp. The control element, in turn, responds to a control signal provided by a lower-rated thermal protector device.

Figure 2:
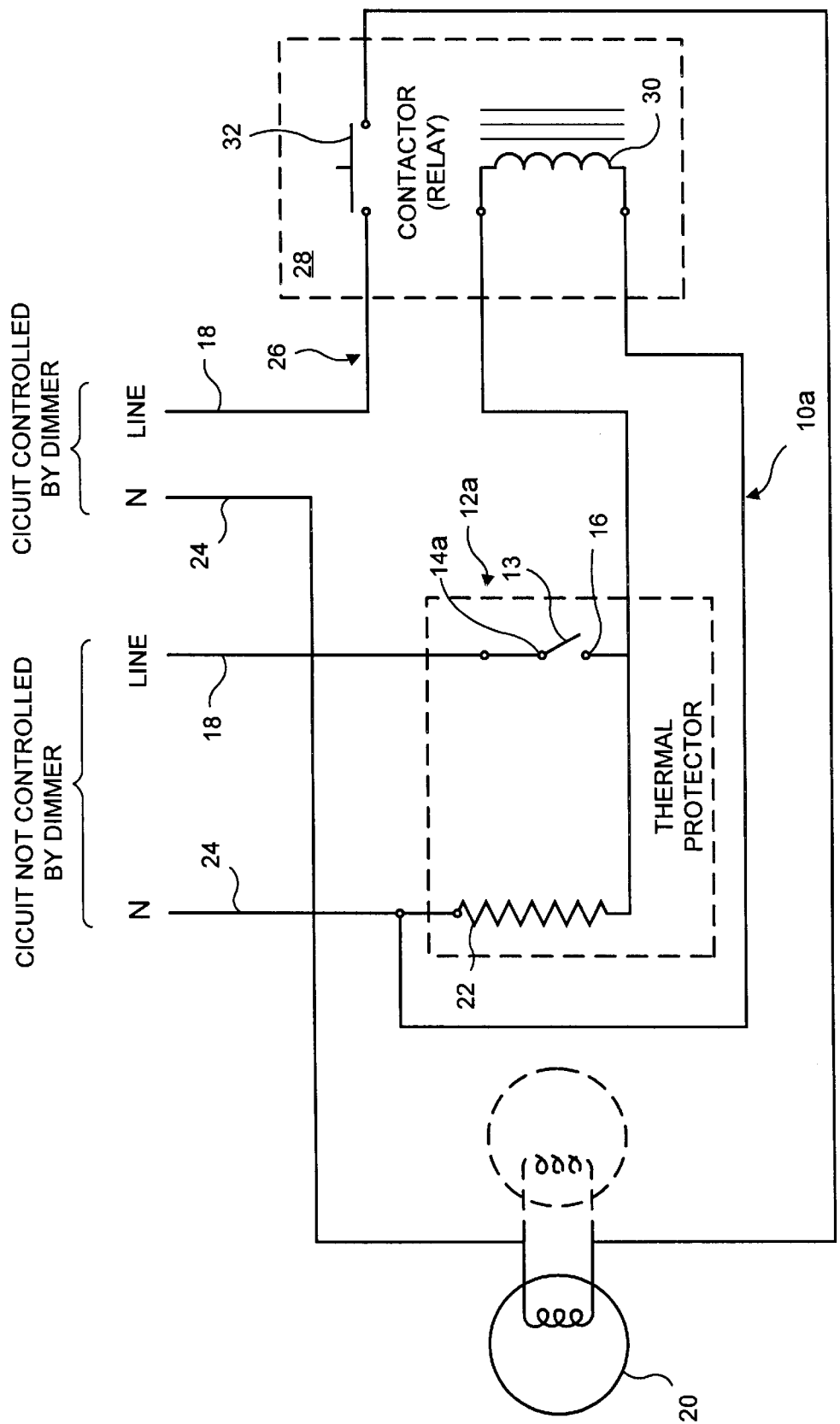
FIG. 2 is a schematic design of a thermal protection system in accordance with an embodiment of the invention.

Turning now to FIG. 2, there is shown a thermal protection system, in accordance with one embodiment of the invention, in which a thermal protection circuit, generally designated 10a, includes a bimetallic switch 12, having a movable contact 13, and fixed contacts 14, 16 connected in series with the ac power line 18 and in parallel with lamp 20 whose power or load rating exceeds that of switch 12. In the embodiment of FIG. 2, switch 12 is also connected in series with a control device 26 whose power or load rating equals or exceeds that of the lamp 20. As shown in FIG. 2, control device 26 may be, as shown, an electromagnetic relay 28, which includes an electromagnetic coil 30 and a contact 32 that is movable between an open and closed condition in response to the activation of coil 30. As shown in FIG. 2, switch contacts 14, 16 of the thermal protector switch 12 are connected in series connection with coil 30 and the ac power line 18, whereas contact 32 is in series connection with lamp 20 and the ac power line 18.

In normal operation, when the ambient temperature in the space surrounding lamp 20, as sensed by the bimetallic switch 12, is below a predetermined value, switch 12 is closed by contact 13 bridging contacts 14 and 16, thereby to cause current from line 18 to flow through relay coil 30. The resulting electromagnetic force produced by the coil 30 causes relay contact 32 to close, thereby connecting lamp 20 through the dimmer control circuit (not shown in FIG. 2) connected between the neutral 24 and line 18 of the ac power line, causing the lamp 20 to glow. When, however, the sensed ambient temperature exceeds a preset maximum, the bimetallic contact 13 of switch 12 is moved to a position at which the circuit between contacts 14 and 16 is opened. When switch 12 is open in this manner, current no longer flows through coil 30 so that relay contact 32 opens, thereby to open the series circuit connection between lamp 20 and the ac power line. Lamp 20 as a result will cease to operate until the ambient temperature around the lamp decreases to a level below the preset maximum at which time switch 12 is again closed, and current again flows through relay coil 30 to close contact 32, so that lamp 20 is again turned on.

Since the thermal protector switch 12, as connected in FIG. 2, is not in series connection with lamp 20 it need not have the same maximum power rating as the lamp; only the rating of relay contacts 32, which is in series connection with the lamp, need equal or exceed the maximum rating of the lamp. That is, only the relay contacts carry the full electrical current powering the lamp 12. The relay coil 30, the only device in the lamp control circuit that is switched by the bimetallic switch 12, draws a lower current that is well below the maximum allowed for the bimetallic switch 12.

Figure 3:
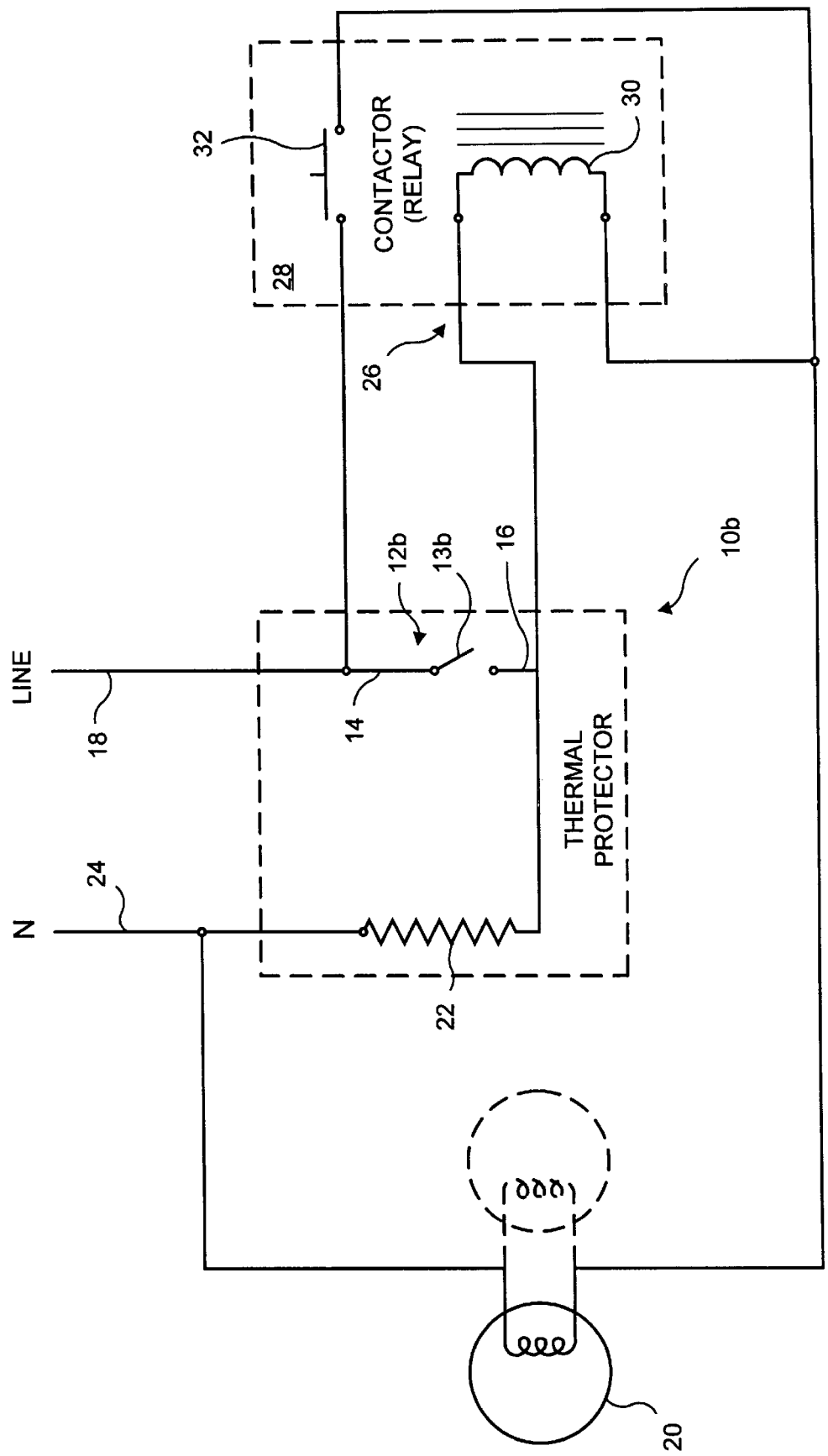
FIG. 3 is a schematic diagram of an alternative embodiment of the thermal protection system of the invention.

The embodiment of the invention illustrated in FIG. 3 is essentially the same as that shown in FIG. 2, with the exception that it does not include a dimmer circuit. In all other respects, the embodiment of FIG. 3 and its manner of operation are the same as that described above with respect to the embodiment of FIG. 2.

Figure 4:
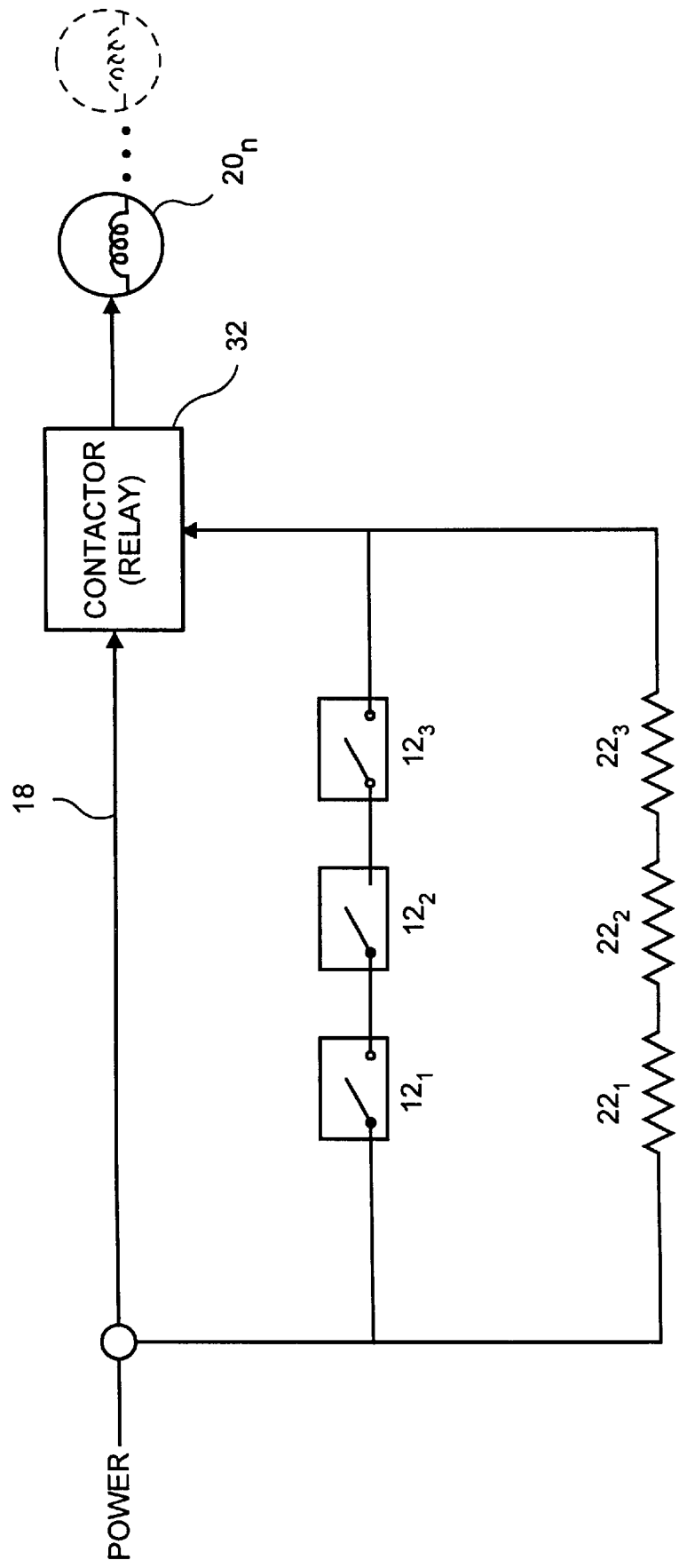
FIG. 4 is a schematic diagram illustrating the connection of a plurality of thermal protector switch elements in a further embodiment of the invention.
Figure 5:
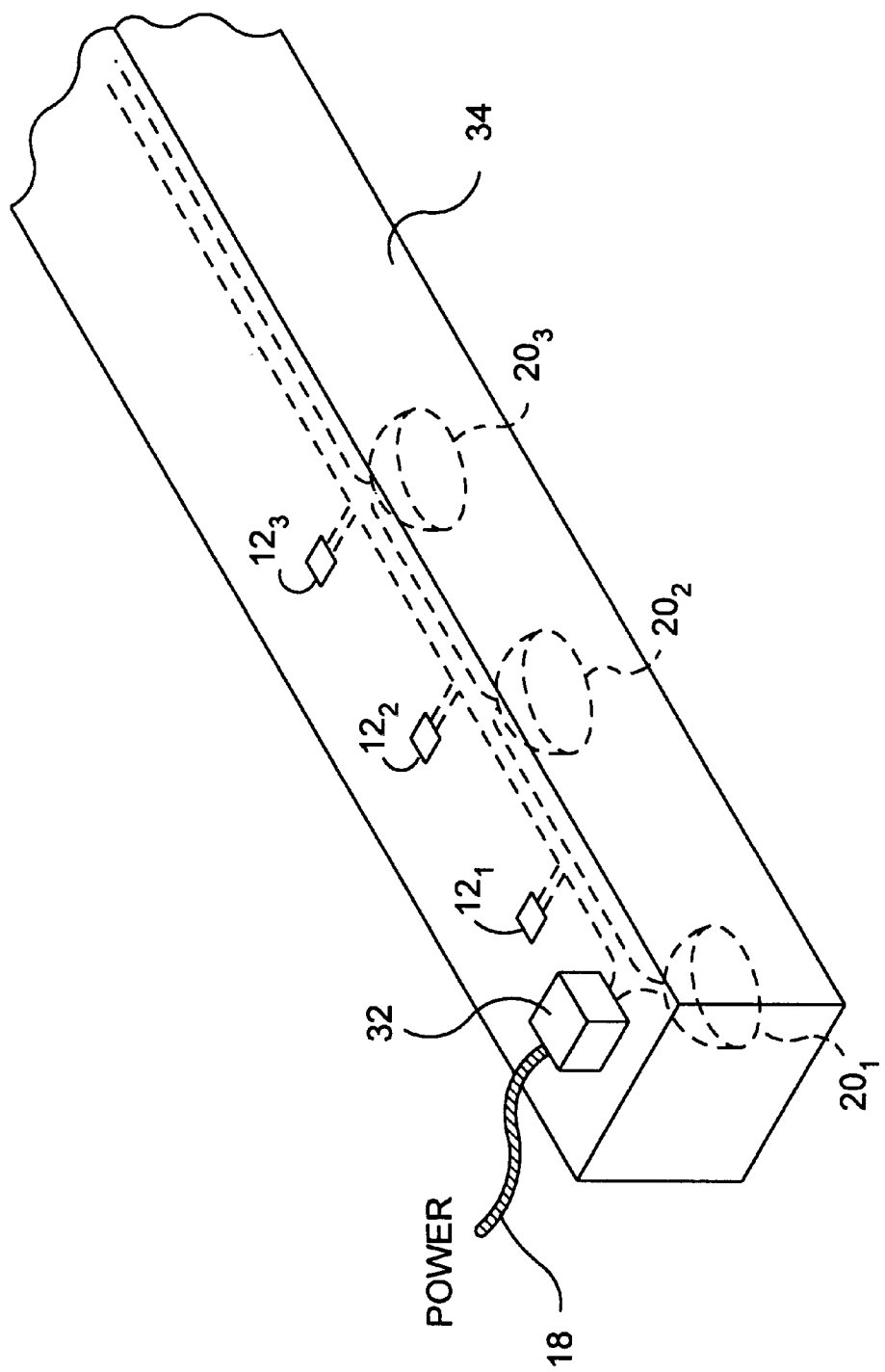
FIG. 5 is a perspective view, partly broken away, of a section of a multilamp recessed lighting fixture in which the thermal protection system of the invention of FIG. 4 is implemented.

As shown in FIGS. 4 and 5, the thermal protection system of the invention may, if desired to increase the capacity of the fixture, include a plurality of (here shown as three) bimetallic switches $12_1$, $12_2$, and $12_3$, connected in parallel with one or more lamps 20 and the ac power line. As in the prior described embodiments, a higher-rated control element, e. g. a relay 28 having a contact 32, is connected in series with the lamp and power line. If desired, a plurality of heating elements here shown as elements 22, $22_2$, and $22_3$, are connected in series with one another and in parallel with the plurality of thermal control switches $12_1$, $12_2$, and $12_3$ to provide a reference temperature for switches 12. The operation of the thermal protection system of FIG. 4 is in all essential respects the same as that of the embodiment of FIGS. 2 and 3.

FIG. 5 illustrates one possible physical implementation of the thermal protection system of the invention shown in FIG. 4. As shown in FIG. 5, the lamps $20_1$, $20_2$, and $20_3$ are electrically connected in series and physically mounted within the interior of an elongated fixture housing 34. The lamps 20 are also connected in series with the power line 18 and the relay contact 32. The bimetallic thermal protectors $12_1$, $12_2$, and $12_3$ are also connected in series with one another and in parallel with the lamps. As shown in FIG. 5, the thermal protectors 12 may be respectively physically mounted in the housing 34 in close proximity to the lamps 20, to sense the temperatures in the environments of the lamps, as desired for the purposes described above.

It will be appreciated from the foregoing description of several embodiments thereof that the system of the invention provides reliable thermal protection for one or more lamps, such as lamps mounted in a recessed lighting fixture, even when the rating of the thermal protector is less than the power rating of the lamp or lamps. It will be further appreciated that modifications to the embodiments shown, such as in the type of thermal protector or type of control device used, may be made without departing from the spirit and scope of the invention as more specifically defined in the following claims.

What is claimed is:

1. A thermal protection system for use with a lighting fixture having at least one lamp having a load rating, said thermal protection system comprising a temperature-sensitive switch having a load rating less than that of the lamp and being physically located in the vicinity of the lamp, the conductive state of said temperature-sensitive switch being modified when the ambient temperature of said temperature-sensitive switch exceeds a predetermined level, and control means having a load rating that equals or exceeds that of the lamp and having a control element whose conductive state is responsive to the conductive state of said temperature-sensitive switch for terminating the flow of operating current to the lamp when the ambient temperature of said temperature-sensitive switch exceeds said predetermined level.

2. The thermal protection system of claim 1, in which said control means includes a relay and said control element is the coil of said relay.

3. The thermal protection system of claim 2, in which said coil is in series connection with said temperature-sensitive switch, said relay further comprising a contact in series connection with the lamp and movable between an open and closed state in respective response to the presence or absence of energizing current in said relay coil.

4. The thermal protection system of claim 1, in which said temperature-sensitive switch is in parallel connection with said lamp and said control means is in series connection with said lamp.

5. The thermal protection system of claim 4, in which said control element of said control means is in series connection with said temperature-sensitive switch.

6. The thermal protection system of claim 5, in which said control means includes a relay and said control element is the coil of said relay.

7. The thermal protection system of claim 6, in which said coil is in series connection with said temperature-sensitive switch, said relay further comprising a relay contact in series connection with the lamp and movable between an open and closed state in response to the presence or absence of energizing current in said relay coil.

* * * * *